April 25, 1939.  J. VISSER  2,155,962
PANEL RECEPTACLE AND CLOSURE
Filed June 1, 1937  2 Sheets-Sheet 1
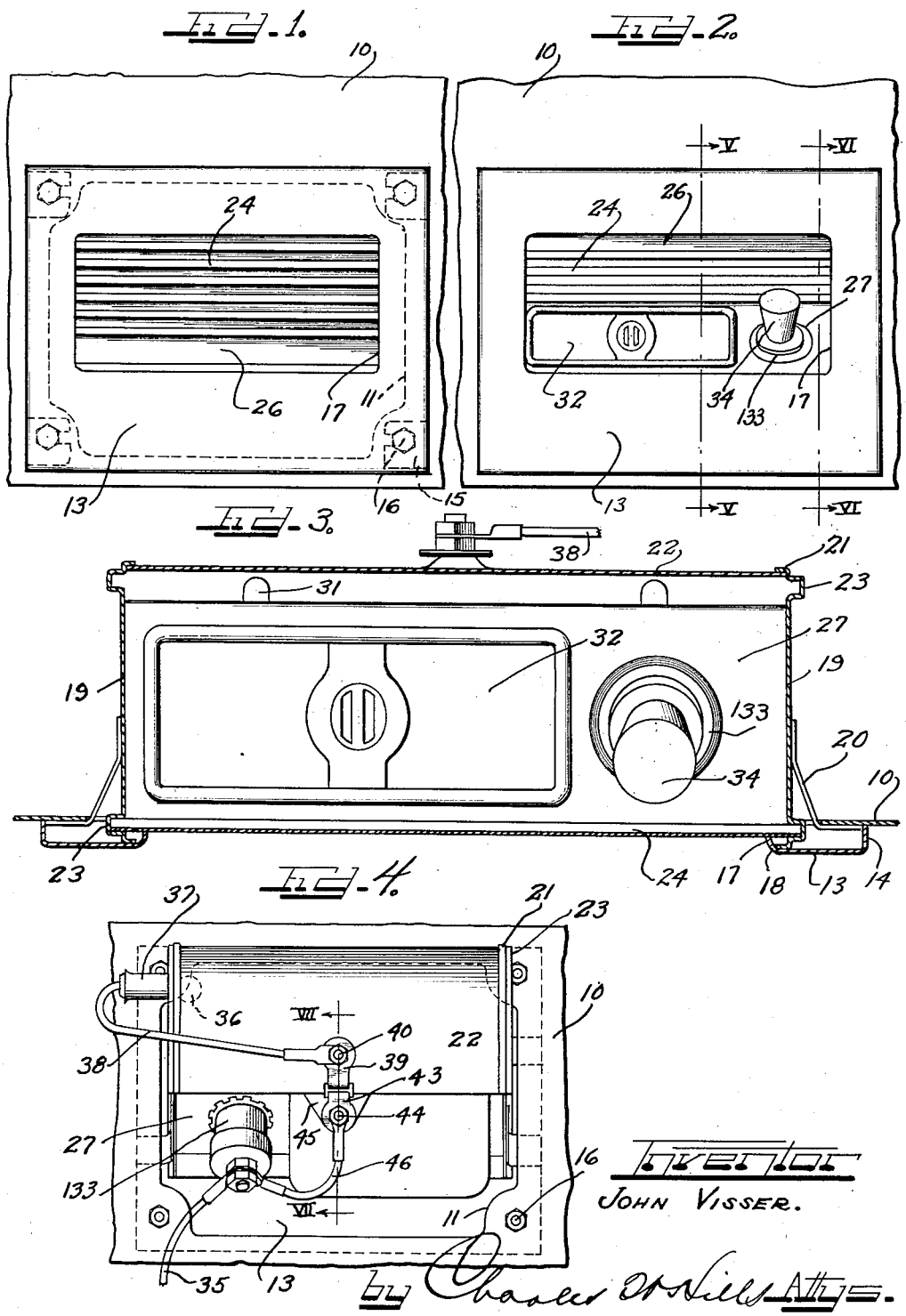
Inventor
JOHN VISSER.

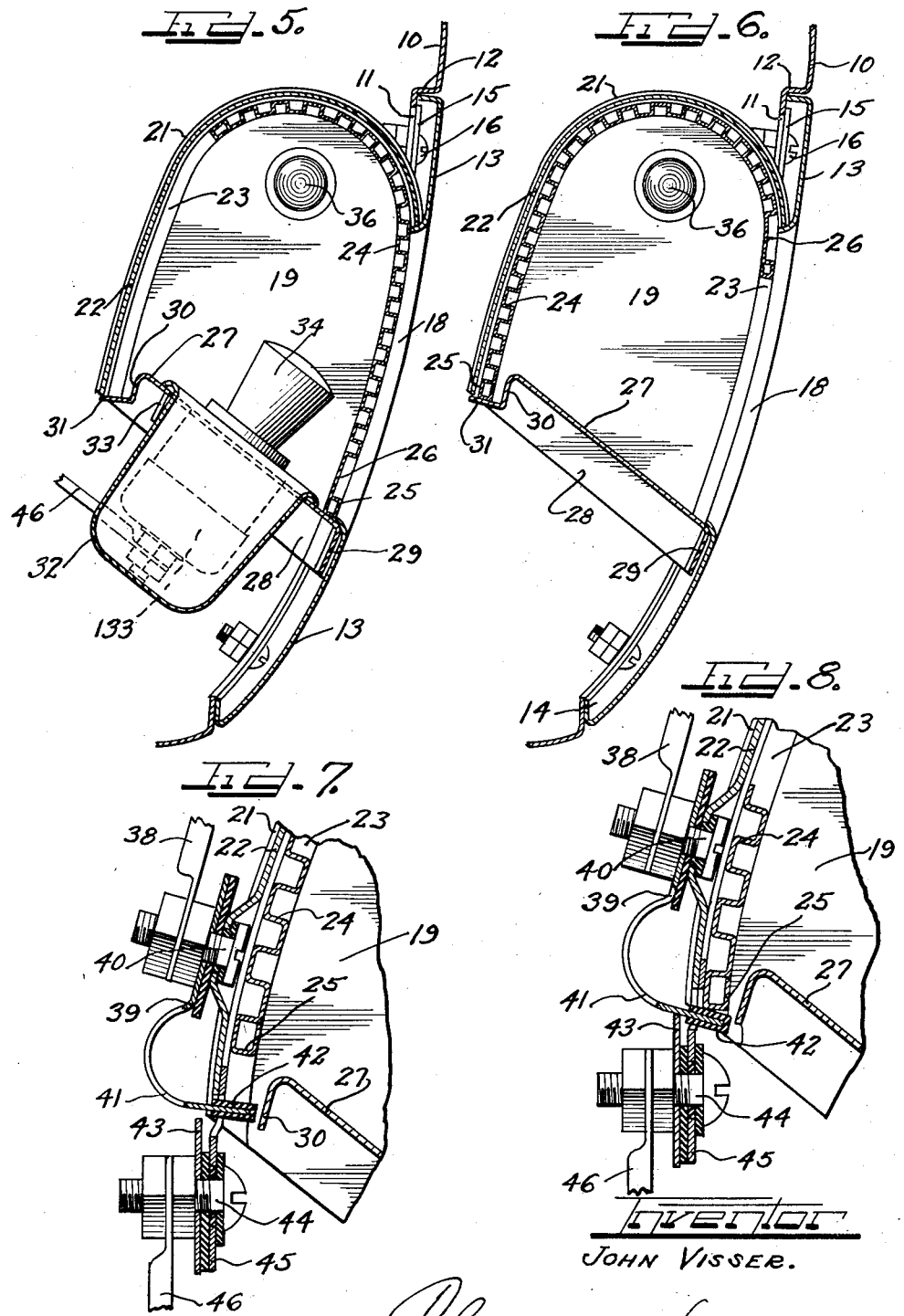

Patented Apr. 25, 1939

2,155,962

UNITED STATES PATENT OFFICE 2,155,962

PANEL RECEPTACLE AND CLOSURE

John Visser, Grand Rapids, Mich., assignor, by mesne assignments, to F. L. Jacobs Co., Detroit, Mich., a corporation of Michigan Application June 1, 1937, Serial No. 145,654

6 Claims. (Cl. 312—190)

This invention relates to improvements in a panel receptacle and closure, and more particularly to a receptacle and closure therefor which may be built in or otherwise installed in a panel arrangement, the invention being highly desirable for use in the panel arrangements of vehicles of nearly every type, although the invention may have other uses and purposes as will be apparent to one skilled in the art.

Utility compartments are frequently provided in the panel arrangements of various vehicles for containing gloves, other light articles of luggage, emergency accessories, cosmetic paraphernalia, and smoking equipment, such as cigarette containers and ash receptacles. These compartments are usually constructed in a handy panel arrangement of the vehicle, such as the instrument panel, the back of a seat, the arm rest or side wall adjacent the seat, and in similar localities easy of access. In many installations, such as aircraft, for example, it is highly important that smoker's accessories be well protected so as to eliminate as much as possible a fire hazard in the use of them. Consequently, a compartment containing smoking accessories must be located in a region where there is no draft, and must be provided with a suitable closure, so that there is no danger of escaping sparks or blowing ashes in the event ignited particles were negligently permitted to remain.

It is an important object of the present invention to provide a panel receptacle and closure embodying the aforesaid advantages.

Another feature of the present invention resides in the provision of a novel panel receptacle assembly which may be opened and closed by the operation of a flexible closure member.

A further object of the invention is the provision of a panel receptacle assembly including a flexible metallic curtain to function as a closure member.

In a panel receptacle containing smoking accessories, it is desirable to have all of the accessories available in the same location to eliminate confusion and accidents. To this end, the present invention provides such a receptacle containing not only an ash receiver, but also an electrically energized lighter, separable when in use from any electrical circuit.

In a device of the nature of this invention, it is also desirable as a safety measure to provide illumination for the proper handling and use of the contents of the panel receptacle. To this end, it is an object of the present invention to provide a panel receptacle assembly containing illuminating means for the main compartment of the assembly.

It is also a feature of this invention to provide a panel compartment assembly containing illuminating means automatically rendered effective upon the opening of the compartment closure member.

Still a further object of the invention is the provision of a panel compartment assembly, in the main compartment of which an incandescent lamp is mounted, this lamp being energized and de-energized upon the opening and closing, respectively, of the compartment cover.

Another feature of the invention is the provision of novel switch means governing the energization of a lamp, and being responsive to the opening and closing movement of a panel compartment cover.

It is also an object of the invention to provide a novel utility compartment assembly which is economical to construct and install, highly pleasing in appearance, and very rugged and durable.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawings, in which:

Figure 1 is a fragmentary elevational view of a panel compartment assembly embodying principles of the present invention, showing the same in operative position in a panel arrangement, with the cover of the compartment in closed position;

Figure 2 is a fragmentary elevational view of the same character as Figure 1, showing the compartment cover in open position;

Figure 3 is an enlarged fragmentary plan sectional view of the compartment assembly;

Figure 4 is a fragmentary rear elevational view of the structure seen in Figures 1 and 2;

Figure 5 is an enlarged vertical sectional view of the compartment assembly, taken substantially as indicated by the line V—V of Figure 2, looking in the direction of the arrows;

Figure 6 is a sectional view of the same character as Figure 5, with the cover member in open position, and taken substantially as indicated by the line VI—VI of Figure 2;

Figure 7 is an enlarged fragmentary vertical sectional view taken substantially as indicated by the line VII—VII of Figure 4, illustrating the cover in nearly full open position; and Figure 8 is a fragmentary sectional view taken at the same point as Figure 7, but illustrating the cover in fully open position, with the corresponding change in position of other mechanism resulting from the full opening of the cover.

For the purpose of clarity, the invention is illustrated and described herein in connection with a panel compartment for containing smoking accessories, although it will be distinctly understood that the compartment assembly, with a slight and obvious rearrangement of the bottom thereof, is equally adaptable for another form of utility compartment, without any change in the general features of construction.

In the illustrated embodiment of the invention, is a panel arrangement 10, which may be any suitable form of panel arrangement, such as an instrument panel, a seat back, the wall adjacent a seat, a door, etc., in or out of a vehicle. The panel member 10 is provided with an aperture 11 of any suitable shape for the reception of the compartment assembly, and adjacent this aperture the margins may be inturned or indented, as indicated at 12 in Figures 5 and 6, so as to leave the compartment assembly substantially flush with the outer face of the panel arrangement.

The compartment assembly proper includes a front panel-like member 13 having an inwardly turned outer margin 14 therearound, from which a plurality of lugs 15 project inwardly to accommodate suitable bolt and nut connections 16 by means of which the compartment assembly is attached to the panel arrangement 10. The front member 13 is also provided with a central aperture 17 defined by an inwardly turned flange 18 (Figures 5 and 6), which not only adds to the attractiveness of the opening, but also serves to position other parts, as will later more fully appear.

In order to define the compartment, a pair of similar end walls 19—19 are provided and may be attached to the front member 13 by means of a plurality of suitable brackets or tabs 20 (Figure 3), preferably integral with the front wall 13 and spot welded or equivalently secured to the end walls 19. Except for the relatively straight bottom edge thereof, each end wall 19 is stepped out and flanged as indicated at 21 to provide a peripheral interior shoulder for the accommodation of the edge margin of a combination back and top member 22 which turns forwardly into abutment with the flange 18 of the front member 13, as seen best in Figures 5 and 6. This member 22 may be joined by spot welding or any equivalent method to the flange arrangement 21 of the end walls.

It will be noted that immediately adjacent the peripheral flange arrangement 21, each end wall is provided with an outstanding peripheral bead 23 providing an interior groove or track for accommodating a slidable closure 24. This closure, in this instance, is in the form of a flexible metallic curtain of substantially a zig-zag cross-section, and preferably made from a single corrugated sheet of metal. The sheet of metal is preferably looped, as indicated at 25, at each end of the closure and, as indicated at 26 in Figures 3, 5 and 6, one of the corrugations is omitted at the forward end of the closure to provide a relatively wide groove for the easy insertion of a finger tip, by which the closure may be slid into open and closed position.

To complete the compartment, a bottom member or sub panel 27 is provided having a depending flange 28 at each end thereof which may be spot welded or equivalently secured to the respective end wall 19. A depending front flange 29 underlies the lower portion of the flange 18 of the front plate 13, as best seen in Figures 5 and 6. The rear edge of the bottom member or sub panel 27 is provided with a somewhat obliquely disposed flange 30 from which integral lugs 31 project at intervals to function as a stop for the flexible cover 24 when moved to fully open position. This bottom plate 27 is apertured to accommodate a suitable ash receptacle 32, which may be of any desirable form, and which is held in position by a plurality of lugs 33, preferably integral with the bottom plate 27. The lugs 33 resiliently and frictionally engage the ash receptacle and thus removably hold it in position. The bottom member is also apertured to accommodate a socket 133 fixedly secured to the bottom member and arranged to receive a lighter 34 of known construction and of the type which may be pressed into the socket to establish electrical contact and held in that position until the filament of the lighter is brought to a glow, when the lighter is removed entirely from the compartment and used to ignite a cigar or cigarette, the lighter occupying a position in its socket out of contact with the bottom when not in use. Energy is supplied to the socket through a suitable conductor cable 35 (Figure 4) from any suitable source of power, such as the vehicle batteries.

In order to provide adequate illumination in the compartment, an incandescent lamp 36 is provided which is mounted in a socket 37 (Figure 4) extending through one of the end walls 19. This lamp is energized through a suitable conductive medium 38 connected to the lamp socket, and also to the upper part 39 of a novel switch construction now to be described.

The switch structure is best seen in Figures 7 and 8, and the upper switch member 39 is held in position by a suitable bolt 40 extending through an aperture in the rear wall 22 of the compartment housing, suitable insulating members being disposed around the bolt adjacent the wall to eliminate grounding of the circuit at this point. The switch member 39 is resilient and the depending free portion 41 thereof is arcuate in shape so that the free end of the switch element extends forwardly beneath the closure 24, which end of the element is covered with suitable insulation 42. This insulated end of the switch member 39 projects directly beneath the inner end of the flexible cover 24, so that when the cover is moved to fully open position, the inner end thereof forces down the part 41 of the element 39 against a second switch element 43. The switch element 43 extends upwardly from a contact bolt 44 engaged through a suitable aperture in a bracket 45 depending from the rear casing wall 22, suitable insulating members being disposed around the bolt between it and the bracket. A suitable conductive medium 46 establishes electrical connection between the bolt 44 and the aforesaid conductive medium 35 at the socket 133, the circuit returning through the panel wall.

It will be especially noted that the contour of the closure grooves 23 in the end walls 19—19 is such that when the cover 24 is moved into nearly open position, approximately the position seen in Figure 7, the cover will respond to gravity and be opened completely to the position shown in Figure 8, by somewhat of a snap action, insuring proper closing of the switch elements 39 and 43. The weight of the cover resting upon the insulated end of the element 39 maintains these switch elements in closed position while the cover remains open. Upon moving of the cover 24 to its closed position (Figures 1 and 5), the switch element 39, due to its inherent resiliency, will move away from the element 43 and thus break the circuit through the lamp 36.

It will also be noted that when the lamp 36 is not needed, the cover 24 may be moved to a partially open position sufficiently to permit access to the ash receptacle 32 and yet not sufficiently for the cover to respond to the action of gravity and close the circuit through the lamp, as before explained.

Of course, it will be appreciated that when the compartment assembly is in position in a panel arrangement, only the front member 13 and flexible cover 24 will be visible when the cover is in closed position, and these parts may be given any desirable finish in keeping with the interior appointments of the vehicle or the structure containing the panel arrangement. For example, the front member 13 may be finished in keeping with the panel arrangement 10, and the flexible cover 24 may be chrome plated or given a two-tone effect by having the outstanding corrugations polished and the inwardly extending corrugations left dull or flat.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. The combination in a panel arrangement, of a panel member having an aperture therein, means disposed behind said member defining a utility compartment, and a corrugated flexible metal curtain slidable in said means and movable across and away from said aperture to function as a closure for said compartment, one of the corrugations being omitted adjacent the forward edge of said curtain to provide a space for the insertion of a member to actuate said curtain.

2. The combination of a panel member having an aperture therein, a structure behind said panel defining a utility compartment accessible through said aperture, a roll top flexible closure slidable in said structure over the aperture and down the back of said compartment, a lamp for illuminating said compartment, and switch means responsive to abutment by the inner end of said closure to energize said lamp, said closure being so positioned that it will respond to gravity when moved nearly to open position and rest on said switch means while in open position.

3. The combination of a panel member having an aperture therein, a structure defining a compartment behind said member accessible through said aperture, a lamp for illuminating said compartment, switch means controlling the operation of said lamp, and a slidable closure for said aperture, means for supporting said closure, said means being so constructed and arranged that when it is moved to its nearly full open position said closure will automatically continue to move when released to its completely open position to close said switch means but said supporting means being arranged so that said closure may be left partially opened to afford access to said compartment and in a position where it will not respond to gravity.

4. With a panel having an aperture therein, an accessory assembly comprising a sub-panel for accessories extending generally rearwardly from the lower side of the aperture of said first panel, a housing for said sub-panel secured thereto including a hood member and a pair of end walls, illuminating means associated with said housing, switch means for connecting said illuminating means to a source of energy, a flexible metal curtain extending between said end walls and arranged for sliding movement along complementary edges thereof into and out of aperture closing position behind said first panel, said curtain being arranged to close said switch means when in a fully opened position with respect to the aperture of said first panel but arranged to leave said switch means open when in a substantially but not quite fully open position, whereby access to said accessory panel may be had without energizing said illuminating means.

5. With a panel having an aperture therein, an accessory assembly comprising a sub-panel for accessories extending generally rearwardly from the lower side of the aperture of said first panel, a housing for said sub-panel secured thereto including a hood member and a pair of end walls, illuminating means associated with said housing, switch means for connecting said illuminating means to a source of energy including a stationary contact member mounted in proximity to the rear edge of said sub-panel and a movable resilient contact finger secured on the rear face of said hood and extending slightly above and across said stationary contact, the end of said finger being electrically insulated, a flexible metal curtain extending between said end walls and arranged for sliding movement along complementary edges thereof into and out of aperture closing position behind said first panel, the rear edge of said curtain being arranged to engage and depress said contact finger by engaging the insulating portion thereof as said curtain is moved into its fully opened position.

6. With a panel having an aperture therein, an accessory assembly comprising a sub-panel for accessories extending generally rearwardly from the lower side of the aperture of said first panel, a housing for said sub-panel secured thereto including a hood member and a pair of end walls, a flexible corrugated metal curtain extending between said end walls and arranged for sliding movement along complementary edges thereof into and out of aperture closing position behind said first panel, at least one pair of adjacent corrugations near the front edge of said curtain being spaced substantially further apart than the normal spacing between corrugations, thereby to provide a space for insertion of a member to actuate said curtain.

JOHN VISSER.